July 26, 1949.  J. W. MYERS  2,477,523
ELECTRICAL BUS STRUCTURE
Filed March 25, 1946  2 Sheets-Sheet 1
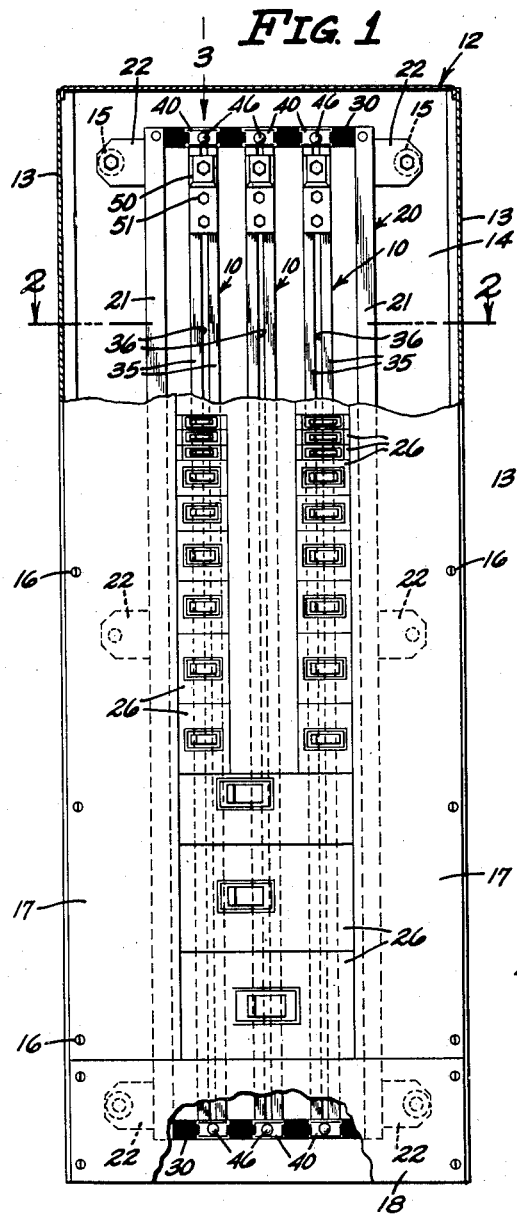
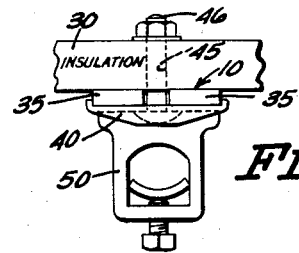
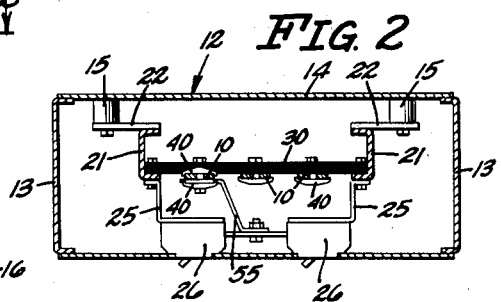
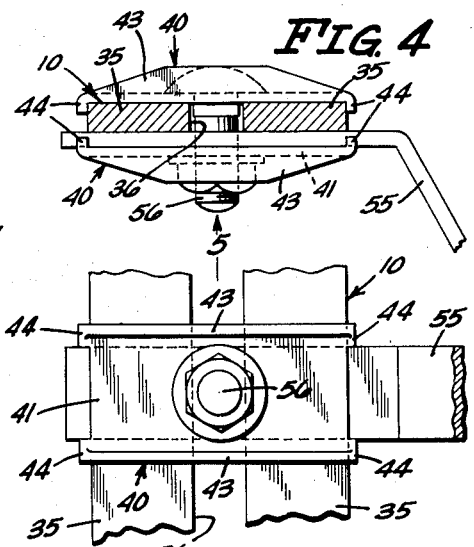
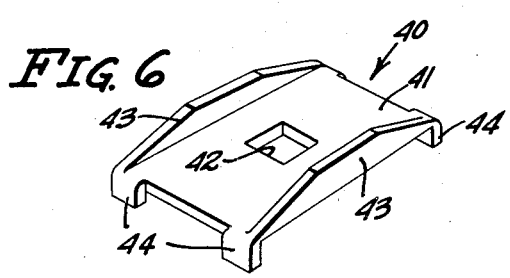
INVENTOR.
JOHN WILLIAM MYERS
BY
Donald L. Mapson
AGENT

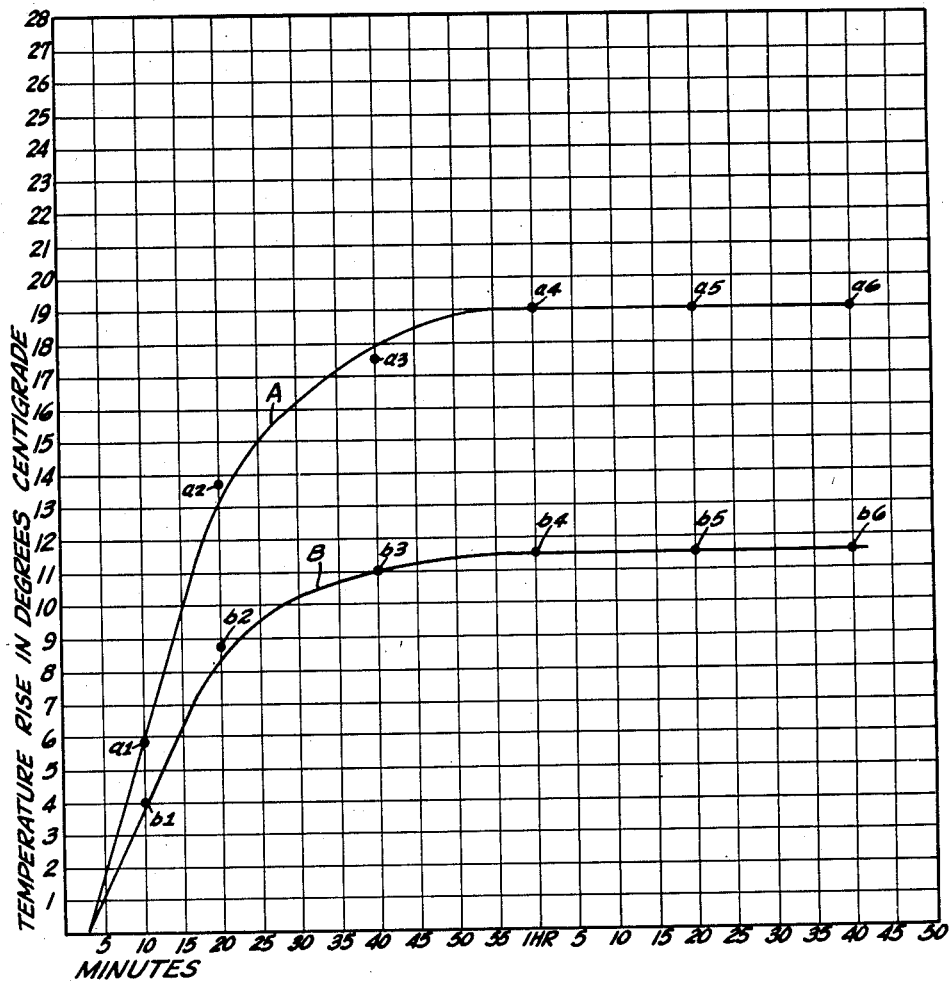

Patented July 26, 1949

2,477,523

UNITED STATES PATENT OFFICE 2,477,523

ELECTRICAL BUS STRUCTURE

John William Myers, Balboa Island, Calif., assignor to Zinsmeyer Company, Los Angeles, Calif.

Application March 25, 1946, Serial No. 656,797

1 Claim. (Cl. 173—273)

This invention relates to panel boards, switchboards, and similar electrical service installations such as employed in factories, theatres, and other installations for the distribution of electricity to the various circuits. More specifically, the present invention relates to the bus structure employed in such switchboards and panel boards for the distribution of electrical current from the current supply cables to the various switches and circuit breakers which control the circuits or to any other electrical instruments or devices which are commonly mounted in switchboards and panel boards.

In supplying electric power to the average factory, for example, the current is delivered to a central switchboard where the current is received by bus bars for further distribution within the switchboard. The bars usually extend in parallel, spaced relation through the switchboard and are connected to the switches and circuit breakers by smaller copper bars known in the art as jumpers. The jumpers are attached to the bus bars by screws or bolts, suitable holes being drilled in the jumpers and threaded holes provided in the bus bar to receive the screws.

In a switchboard having a large number of closely spaced switches and circuit breakers, many jumpers are required to conduct the current from the bus bars to the switches. This necessitates drilling and tapping many holes in the bus bars. The common practice has been to drill and tap the bus bar material along the center line at closely spaced, equidistant centers before the bars are mounted in the switchboard. The drilled and tapped bus bar material is kept in stock for future use even though the exact number and location of switches in a future switchboard is not known.

Bus bar material may be also purchased with the tapped holes provided at given spacings. Although this practice often results in the drilling and tapping of as many as fifty to seventy-five per cent more holes than are generally required, it has proven more economical to follow this practice than to machine each set of bus bars to fit a particular switch or panel board. Even though the holes are provided on closely spaced centers, it often occurs in the assembly of a switchboard that some of the predrilled holes do not line up properly with some of the switches thereby requiring the drilling and tapping of additional holes in addition to those already provided.

As the current carrying capacity of a bus bar depends on the cross sectional area of the bar, the metal removed by drilling holes for the jumpers reduces the capacity of the bar, particularly when a large number of closely spaced holes are drilled in the bar.

Another difficulty encountered in the practice outlined above is the changing of a switchboard after the board has been installed and in use. It is often necessary to add switches and change the location of switches to accommodate additional circuits which may necessitate the drilling and tapping of additional holes in the bus bars. After drilling and tapping a hole, the burrs around the hole must be carefully removed to insure full contact between the bus bar and jumper.

It is accordingly an object of the present invention to provide a novel bus bar and jumper arrangement whereby the provision of holes in the bus bar is entirely eliminated.

A further object of my invention is the provision of a bus bar and jumper arrangement whereby the jumper may be connected to the bus bar at any desirable location without drilling and tapping holes in the bar.

Another object of this invention is the provision of a bus bar and jumper arrangement which will permit changing the position of the jumper in relation to the bus bar in an extremely simple manner.

Still another object of my invention is the provision of a bus bar of greater current carrying capacity.

A further object of my invention is the provision of a novel clamping means for attaching a jumper to the bus bar of the present invention.

Further objects and advantages will become apparent in the following description taken in connection with the accompanying drawings, in which:

Fig. 1 is a front elevational view of a panel board unit, a portion of the front panel being broken away to expose the bus bars to which the present invention relates.

Fig. 2 is a horizontal sectional view taken on the line 2—2 of Fig. 1.

Fig. 3 is an enlarged end view of one of the bus bars shown in Fig. 1 looking in the direction of the arrow 3 of Fig. 1.

Fig. 4 is an enlarged, transverse sectional view showing the manner in which a branch jumper is clamped to one of the bus bars.

Fig. 5 is a fragmentary, elevational view of the structure shown in Fig. 4.

Fig. 6 is a perspective view of one of the clamps used in connection with the bus bar of my invention.

Fig. 7 is a graph showing the results of a test conducted for the purpose of comparing the current carrying capacity of the bus bar of my invention with that of the conventional bus bar.

Referring specifically to the drawings, a preferred form of bus bar 10 of my invention is shown in Fig. 1 in connection with a typical panel board unit 12, it being understood that the bus bar structure of the present invention may be used in many different electrical installations other than the panel board 12. The unit 12 includes side panels 13 to which a back panel 14 is fixed as shown in Figs. 1 and 2. Removably fixed on the front of the unit 12 by screws 16 are cover panels 17 and 18. Provided on the inside surface of the back panel 14 are posts 15 for supporting a frame 20.

The frame 20 includes a pair of vertical channel members 21 to which mounting plates 22 are welded. The plates 22 are bolted to the posts 15 thereby supporting the frame 20 within the unit 12. Fixed to the channel members 21 are angle brackets 25 for supporting circuit breakers 26 as seen in Fig. 2. Extending transversely between the channel members 21 are bars 30 of electrical insulating material, one of the bars 30 being provided at the top of the frame 20 and another at the bottom as shown in Fig. 1.

The bus bars 10 are mounted on the insulating bars 30 and are coextensive with the frame 20 as shown in Fig. 1. Each of the bus bars 10 includes a pair of identical copper bars 35 spaced to provide a slot 36 of uniform width and coextensive with the bus bars 10.

Provided at each end of each of the bars 10 is a clamp member 40 as shown in Figs. 1, 3, and 6. Each of the clamp members 40, as seen in Fig. 6, is formed to provide a rectangular plate 41 having a central square hole 42. Opposite edges of the plate 41 are bent to form stiffening ribs 43. Downstruck at each of the four corners of the member 40 are projections 44.

The bus bars 10 are clamped to the insulating bars 30 as shown in Fig. 3. Bolt holes 45 are drilled through the bars 30 at the desired center line of each of the bus bars 10. Carriage bolts 46 are inserted through the clamps 40, slots 36, and hole 45. Tightening of the bolts 46 clamps the bars 35 of the bus bars 10 securely between the clamp members 40 and the insulating bars 30. The projections 44 of the clamp members 40 engage outside edges of the bars 35 thereby positioning and retaining the bars 35 against outward movement. The bolt 46, as seen in Fig. 3, prevents the bars 35 from moving toward each other, the bolts 46 and projections 44 of the clamp members 40 coacting to positively retain the bars 35 in predetermined, spaced relation.

Mounted on upper ends of the bus bars 10, as seen in Figs. 1 and 3, are cable lugs 50 bolted to the bars 10 by bolts 51 (see Fig. 1) the latter passing through the slots 36. The lugs 50 receive current supply cables (not shown) which supply current to the bus bars 10.

From the bus bars 10, electrical current is distributed to the various circuit breakers 26 by jumpers 55 as shown in Figs. 2, 4, and 5. The jumpers 55, like the bars 35 of the bus bars 10, are made of copper and are secured to the bus bars 10, as shown in Fig. 4, by two of the clamp members 40 and a carriage bolt 56. The space between the projections 44 of the clamp member 40 is sufficient to receive the jumper 55, as seen in Fig. 5, the projections engaging edges of the jumper thereby retaining the clamp members in alignment longitudinally with the jumpers.

Tightening of the carriage bolt 56 clamps the bars 35 and the jumper 55 firmly and evenly together thereby insuring full electrical contact. Wherever jumpers are clamped to the bus bars 10, the clamps 40 retain the bars 35 in proper spaced relation as a result of engagement of the projections 44 of each of the clamp members 40 with outside edges of the bars 35.

The location of any of the jumpers 55 in relation to the bus bar 10 may be readily changed by loosening the bolt 56 and sliding the jumper 55 and clamp members 40 along the bus bar to the desired location and tightening the bolt 56.

Reference is now made to the graph shown in Fig. 7. The curves A and B indicate the results of a comparative test conducted in the following manner:

Two bus bars, one of conventional design and one of equal length made in accordance with the bar 10 of the present invention, were connected to a supply of electrical current of 250 amperes. The conventional bus bar was one quarter inch thick by one inch in width. The bar 10 used in the test included two, one quarter inch by one half inch bars, the amount of material in the conventional bar being equal to the amount of material in the bars comprising the bar 10. Thermocouples were attached to the center of each of the bars being tested and temperature readings were taken at the intervals indicated on the graph of Fig. 7.

The curve A along points $a1$ to $a6$ inclusive indicate the temperature of the conventional bus bar taken at the time increments indicated on the graph. The points $b1$ to $b5$ inclusive of curve B indicate the successive temperature readings of the bus bar of my invention.

It will be noted on the graph that after one hour, the temperatures of the two bars leveled off, the conventional bar having risen nineteen degrees centigrade while the bar 10 rose but eleven and five tenths degrees. This test indicates that the bus bar of the present invention will carry more current than the conventional type of equal cross-sectional area without exceeding the permissable rise in temperature.

One reason for the superior performance of the bus bar 10 is the absence of the holes which are necessary in the conventional bar.

Another reason for the greater efficiency of the bus bar of the present invention, as indicated on the graph of Fig. 7, is the greater heat radiating area of the bar 10 as compared with the area of a conventional bar.

Although I have shown and described but one preferred embodiment of the structure of my invention, it is understood that various modifications and changes may be made therein without departing from the spirit of the invention or the scope of the appended claim.

I claim as my invention:

A clamp for securing a jumper to a pair of parallel, spaced bars used as a single bus bar, said clamp comprising identical clamp members, each having projections extending from a clamping face thereof, the projections on one of said members engaging edges of said spaced bars to prevent rotation of said member relative to said bars and to retain said bars in proper spaced relation, a jumper disposed between said bars and the other of said pair of said clamp members, and a central bolt passing through said clamp members and said jumper, the projections on one of said clamp members engaging edge portions of said jumper preventing rotation of said member relative to said jumper, the length of said projections being less than the thickness of said jumper thereby permitting rotation of said jumper and said clamp member without contact of said projections with said bus bars.

JOHN WILLIAM MYERS.

REFERENCES CITED

The following references are of record in the file of this patent:

UNITED STATES PATENTS

| Number | Name | Date |
|---|---|---|
| 1,620,552 | Jacobs | Mar. 8, 1927 |
| 2,084,580 | Frank | June 22, 1937 |
| 2,261,857 | Novak | Nov. 4, 1941 |

FOREIGN PATENTS

| Number | Country | Date |
|---|---|---|
| 55,467 | Norway | July 22, 1935 |